Figure 1:
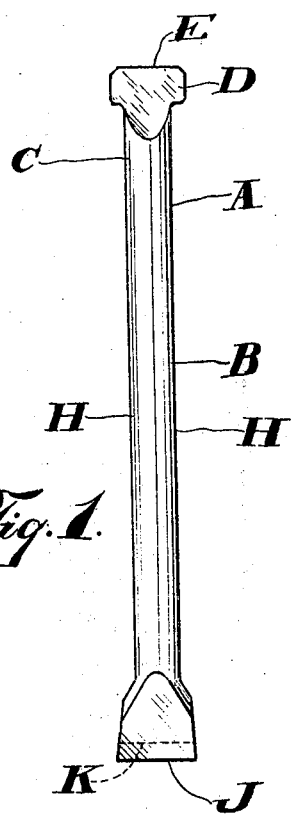

Feb. 28, 1928.

C. C. HANSEN 1,660,507

BROACHING TOOL

Filed Jan. 7, 1927

INVENTOR.
Charles C. Hansen.
BY Herbert G. Ogden
HIS ATTORNEY.

Patented Feb. 28, 1928.

1,660,507

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

BROACHING TOOL.

Application filed January 7, 1927. Serial No. 159,600.

This invention relates to broaching tools but more particularly to broaching tools of the type used for broaching slate, marble and other rock formations.

The present invention is more particularly adapted for use in rock drills of the hammer type and may be provided with a suitably reduced shank to render the tool capable of being inserted in the ordinary type of front head in place of the drill steel. Probably an even greater field of usefulness of the present invention is found in that type of broaching tool in which there is little or no variation in cross section throughout the length of the tool, that is, tools in which the shank is of substantially the same form and area as the body portion of the tool and in which the shank is of greater width than thickness. When embodied in tools of the latter type, the present invention renders such tools capable of being readily adjusted to the most suitable positions with respect to the work and in that way eliminating the necessity of frequent re-adjustment of the entire drilling or broaching mechanism.

It is an object of the present invention to obtain a light weight broaching tool which will be fully capable of withstanding the repeated severe blows imparted thereto, and to reduce the weight of tools of this type without sacrificing the desirable qualities of rigidity and strength.

Other objects will appear hereinafter.

Figure 2:
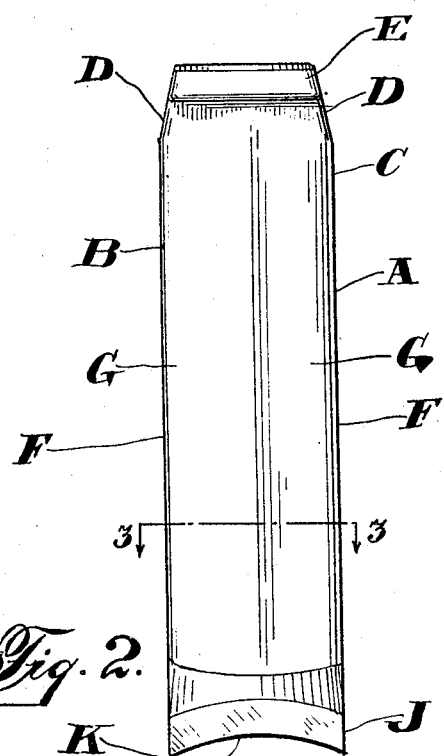
Figure 3:
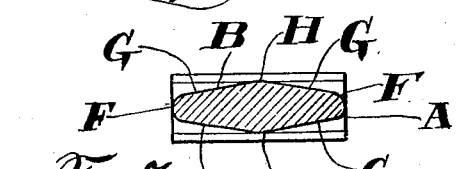
Figure 4:
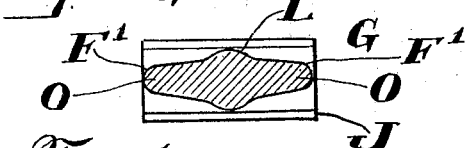
Figure 5:
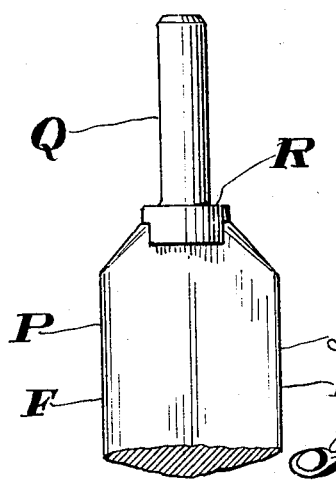

In the drawings accompanying the specification,

Figure 1 is a side elevation of a broaching tool having a shank of substantially the same cross sectional area as the body portion of the tool, Figure 2 is a front elevation of the tool, Figure 3 is a transverse view taken through Figure 2 on the line 3—3 looking in the direction of the arrows, Figure 4 is a view similar to Figure 3 illustrating a modification of the invention, and Figure 5 is a front elevation of a portion of a modified form of broaching tool.

Referring to the drawings, a broaching tool designated generally by A comprises in this instance a body portion B in which the rearward or upper end of the body portion serves as a shank to extend into a broaching attachment or other suitable element whereby the broaching tool may be supported and guided. The body portion B and that portion of the tool which may be termed the shank C are preferably of substantially the same cross sectional area. In the present instance the shank C is provided with inclined flat surfaces D intended to reduce the head E of the tool A to a length more nearly approaching the diameter of the hammer piston or other element of a rock drill whereby the broaching tool is actuated.

In cross section, the tool is preferably of substantially diamond shape, and has rounded longitudinal edges F which extend throughout the length of the body portion of the tool. From these rounded edges F diverge flat sides G which converge to points in a plane extending through the longitudinal axis of the tool, thus forming apices H on opposite faces of the tool. At this point the tool A reaches its maximum thickness.

Certain desirable advantages are obtained by thus constructing the body portion B and the shank C of the tool. A few of these are that by rounding the edges F as described, the frequent breakage which has heretofore occurred in tools of this character will be eliminated, the weight of the tool may be materially reduced without weakening it, the required rigidity of the tool may be maintained, the tool may be of the necessary strength at the point at which it is most essential, that is, through the longitudinal central portion of the tool and the tool may oscillate freely in a holder or broaching attachment without causing undue wear on the guiding surfaces of such attachment.

Any desirable cutting bit may be provided for the tool. In the present instance the tool is provided with a cutting bit J which is of somewhat greater thickness than the body portion B so that when cutting rock or other material only a relatively small area of contact will exist between the tool and the work. The cutting bit J is provided with a concave surface K to enable the tool to be readily guided and held against departure from the desired course.

By thus forming the inclined surfaces G on the sides of the broaching tool, said broaching tool may be advantageously used in the ordinary type of broaching attachment having a rectangular guideway for guiding the tool and in which the width of such guideway substantially equals the maximum thickness of the tool. The distance between the apices H may be approximately the same as the width of the guideway in such broaching attachment. In this way the broaching tool will be prevented from inclining from its longitudinal axis, at the same time, the tool A will be free to oscillate somewhat about its longitudinal axis, thus enabling the cutting bit to more readily adjust its position with respect to the work. This feature is particularly desirable in broaching tools of this type which are frequently used for reducing or cutting the wall between adjacent holes of a series of holes drilled along the line at which point it is desired to sever a block of rock from the mass and eliminates the necessity of frequent shifting of the entire drilling mechanism to obtain the best results.

In the modification illustrated in Figure 4, the angle of inclination of the sides G is somewhat more acute than that of the corresponding sides shown in the preferred modification and the sides G merge into the periphery of a central cylindrical portion L so that in effect the body portion of this modification comprises a central cylindrical portion L having webs O. The edges F' of the webs O are also rounded for the purpose hereinbefore stated.

Referring now to the modification shown in Figure 5, a broaching tool designated by P is provided with a cylindrical shank Q which may be suitably proportioned to enable it to be inserted in the ordinary type of front head of a rock drill, thus enabling the broaching tool to be substituted for the drill steel without necessitating removal of the front head and the substitution of a broaching attachment therefor.

At the juncture of the broaching tool P and its shank Q is formed a collar R which may abut the front end of a rock drill to limit the distance which the shank may extend into the rock drill. The body portion S of the broaching tool P may be of a cross section corresponding to either that shown in Figures 1 to 3 inclusive or to that shown in the modification in Figure 4, or may be of any other suitable form which will fall within the spirit of the invention and the scope of the claims.

I claim:

1. A broaching tool comprising a body portion having rounded longitudinal edges, flat sides diverging from the rounded edges and converging to form a pair of apices located on opposite sides of the body portion in a plane extending through the longitudinal axis of the body portion, a head at one end of the body portion, and a cutting bit at the other end.

2. A broaching tool comprising a body portion of substantially diamond shape cross section to enable said tool to oscillate in a guiding member, reduced rounded longitudinal edges extending through the length of the body portion, a head at one end of the body portion, and a cutting bit at the other end.

In testimony whereof I have signed this specification.

CHARLES C. HANSEN.